United States Patent Office 3,294,847
Patented Dec. 27, 1966

3,294,847
METHOD FOR THE PREPARATION OF ETHER-CONTAINING CHLORIDES
Robert L. Albright, Philadelphia, and Charles H. McKeever, Meadowbrook, Pa., assignors to Rohm & Haas Company, Philadelphia, Pa., a corporation of Delaware
No Drawing. Filed Sept. 11, 1962, Ser. No. 222,958
7 Claims. (Cl. 260—615)

This invention deals with a process for the preparation of ether-containing chlorides from their corresponding alcohols, glycols, and polyglycols without cleavage of the ether bonds. More particularly, this invention relates to the preparation of compounds of the general formula $R'(OCH_2CH_2)_nCl$ from $R(OCH_2CH_2)_nOH$, by reaction with phosphorus trichloride where $n$ is an integer of from one to 20, R is alkyl of one to eight carbon atoms, aryl of six to ten carbon atoms, alkylaryl of 7 to 18 carbon atoms, arylalkyl of 7 to 10 carbon atoms, $HOCH_2CH_2$— or $ClCH_2CH_2$— and R' is alkyl of one to eight carbon atoms, aryl of six to ten carbon atoms, arylalkyl of 7 to 10 carbon atoms, alkylaryl of 7 to 18 carbon atoms, or $ClCH_2CH_2$—. R represents all of the groups that R' does and, in addition, may be $HOCH_2CH_2$—.

Compounds of the above type have been prepared in a variety of ways—by the chloroethylation of dioxane (U.S. Patent 2,383,091), ethylene chlorohydrin (U.S. Patent 2,017,811), polyoxyethylene diols (U.S. Patent 2,352,745), polyoxyethylene chlorohydrins (U.S. Patent 2,352,745), and ethylene (U.S. Patent 2,421,903). In addition 1,2-bis(2-chloroethoxy)-ethane has been synthesized by the copper catalyzed coupling of 2-chloroethyl 1-chloromethyl ether [K. Teramura and R. Oda, J. Chem. Soc. Japan, 54, 605 (1951)] and by the action of thionyl chloride on triethylene glycol [G. F. Zellhoefer, Ind. Eng. Chem. 29, 548 (1937)]. In most of the methods cited either the yield of product is low or there is obtained undesired mixtures of compounds which are very difficult to separate. Furthermore, when thionyl chloride is employed as an agent for the replacement of hydroxyl groups by chlorine the cost per chlorine introduced is too high for a commercially attractive process since only one of the chlorine atoms is used per molecule of thionyl chloride ($SOCl_2$) while the other is lost as hydrogen chloride.

It is well-known that ether linkages are readily cleaved by acids with the cleavage being most facile in the presence of good nucleophiles (R. C. Fuson, "Advanced Organic Chemistry," pp. 177–183, John Wiley and Sons, Inc., New York, 1950). That is, in a system containing both an alcohol and an ether function, it would be predicted that conversion of the alcohol function to chloride employing a method in which hydrogen chloride is generated would involve concurrent cleavage of the ether function.

The present invention deals with a process whereby ether-chlorides are prepared in high yields from ether-alcohols, ether-glycols and polyglycols, without appreciable cleavage of the ether bonds, by the action of phosphorus trichloride. Yields consistently in the range of 75 to 85% of theory are obtained with only small amounts of undesired side products. Accordingly, the present invention provides an efficient, convenient, and commercial process for the preparation of materials containing both chloride and ether functionality.

The process of this invention involves the addition of phosphorus trichloride to the hydroxy-compound at a temperature of about 0° to 90° C., preferably 10° to 70° C. at atmospheric or higher pressures followed by a reaction period in the presence of hydrogen chloride at 80° to 200° C., preferably 120° to 160° C., to consummate the reaction.

Stoichiometric quantities of glycol or alcohol and phosphorus trichloride are employed. Excess phosphorus trichloride may be used, but should not exceed 10% because at the temperature required to carry the desired reaction to completion, use of larger excesses of phosphorus trichloride favor side reactions which give phosphine, phosphorus, and phosphates. At pressures below 15 p.s.i.g. 2 to 5% excess phosphorus trichloride appears to be advantageous.

In some instances, carrying out the reaction in the presence of small quantities of dimethylformamide (5 to 30 mole percent of the hydroxy-compound charged) is beneficial.

The reaction is readily carried out by adding the phosphorus trichloride to the hydroxy-compound at a temperature between 0° and 90° C., preferably 10° to 70° C. The addition of the phosphorus trichloride may be performed at atmospheric or higher pressures over any length of time, but for highest efficiency should be conducted so that no phosphorus trichloride is lost during the addition. After the addition of the phosphorus trichloride the reaction temperature is raised to 80° to 200° C., preferably 120° to 160° C., in order to complete the reaction. If the addition of phosphorus trichloride and subsequent heating are carried out at a pressure below that required to retain the evolved hydrogen chloride, the hydrogen chloride that is lost must be replaced. In carrying out the reaction at atmospheric pressure between 30 and 50% of the available hydrogen chloride is lost and must be replaced. If a high pressure reactor is employed, the hydrogen chloride that is formed can be retained, and no additional hydrogen chloride need be furnished to carry the reaction to completion. It is, therefore, desirable to conduct the reaction at greater than atmospheric pressure up to about 150 p.s.i.g., preferably 2 to 130 p.s.i.g.

After the phosphorus trichloride has been added, the mixture is heated, preferably with agitation, as rapidly as possible to the final reaction temperature. The autogenous pressure developed during the heating will vary depending upon the rate of heating, increasing as the rate of heating increases. The pressure developed does not usually exceed 130 p.s.i.g. and begins to drop at about 120° C.

A preferred embodiment of the present invention is to conduct the reaction in two stages with two reactors connected in series. This modification eliminates the need for pressure equipment while utilizing better than 95% of the available hydrogen chloride at pressures below 2 p.s.i.g. The phosphorus trichloride is pumped into the glycol or ether-alcohol in reactor one while a previously prepared reaction mixture from reactor one is heated in reactor two at the preferred temperature of 120° to 160° C. The addition of phosphorus trichloride is begun at room temperature (about 25° C.) and about half of the addition time is allowed for the temperature of reactor one to reach 70° C. The temperature of reactor one is maintained at 70° C. while the remainder of the phosphorus trichloride is added. The addition time is so regulated that the rate of hydrogen chloride evolution from reactor one at a pressure of ≦5 p.s.i.g. does not exceed the rate of hydrogen chloride absorption by the reaction mixture in reactor two when at a pressure of ≦5 p.s.i.g. When the phosphorus trichloride addition is completed, reactor one is heated to 90° C. (the temperature at which hydrogen chloride evolution ceases) at such a rate that the mixture in reactor two can absorb the gas with a minimum of venting (0.5 to 1.0 hour time). Some venting is usually required during the phosphorus trichloride addition and heating since expansion of the air in reactor one causes a build up of pressure from the inert gas. When the pressure in reactor one has dropped to zero, the mixture is ready for treatment in reactor two.

The reaction in reactor two is completed by maintaining the stirred reaction mixture in an atmosphere of hydrogen chloride under 5 p.s.i.g. maximum pressure at 140° to 160° C. The system is vented periodically or continuously to remove inert gases which slowly accumulate. Under these conditions the time required for the yield of chloride to reach a maximum is three to four hours. The reaction mixture from stage two is cooled to room temperature and withdrawn for isolation of pure product. The contents of reactor one are charged to reactor two and the cycle is repeated.

The product, if sufficiently volatile, can be isolated directly from the reaction mixture by distillation under vacuum (5 mm. mercury pressure or less) to a still pot temperature of 150° C. If desired, a small amount of aqueous sodium carbonate or sodium chloride solution may be added to the reaction mixture. Two layers result and the product can be separated, washed with sodium carbonate solution and dried. The products can be purified further by vacuum fractional distillation.

The compounds prepared by the present process may be represented by the formula $R'(OCH_2CH_2)_nCl$, as discussed previously. Typical embodiments of $R'$ include methyl, butyl, pentyl, octyl, phenyl, naphthyl, methylphenyl, butylphenyl, octylphenyl, nonylphenyl, dodecylphenyl, dibutylphenyl, benzyl, phenylethyl, and chloroethyl.

The present invention may be more fully understood from the following examples which are offered by way of illustration and not by way of limitation. Parts by weight are used throughout.

EXAMPLE 1

This example illustrates the preparation of triethylene glycol dichloride [1,2-bis(2-chloroethoxy)-ethane] from triethylene glycol and phosphorus trichloride at atmospheric pressure. Into a three-necked one-liter round-bottomed flask which is fitted with a Claisen head attached to a downward-sloping distillation condenser are placed 225.3 parts (1.5 moles) of triethylene glycol and 5.5 parts (0.075 mole, 5 mole percent based on glycol) of dimethylformamide. To the distillation condenser is attached a fraction cutter from which the exit gases are led through an exit flowmeter to a trap filled with sodium hydroxide solution.

To the mixture which is heated to 70° C. is added underneath the surface of the liquid 144.2 parts (1.05 moles, a 5% excess) of phosphorus trichloride at such a rate that the addition requires one hour. When the addition has been completed, the dip tube carrying the addition funnel is replaced with a sintered-glass gas dispersing tube. Anhydrous hydrogen chloride gas is introduced at the bottom of the reaction mixture with stirring at a rate of 78 milliequivalents per minute while the mixture is heated to 150° C. The rate of hydrogen chloride introduction and the temperature are maintained for four hours during which time a portion of the dichloride distills out and is collected. The light yellow two-phase reaction mixture is cooled to room temperature and combined with the distillate.

Product isolation by procedure 1 as described below affords 238.7 grams (85.1% of theory) of triethylene glycol dichloride, boiling at 83°–84° C. at 2.0 mm. mercury pressure.

Product isolation

The reaction mixtures are worked up by one of three procedures. Each procedure gives essentially the same yield of product.

(1) The reaction mixture is stripped without a column at reduced pressure (2.0 mm. mercury or less) to a pot temperature of 150° C. The distillate, crude dichloride, is vacuum fractionated through a 10 bubble plate column at a reflux ratio of 10:1 or 5:1 until the vapor temperature of the dichloride is reached. The crude triethylene glycol dichloride contains between 9 and 12% low boiling materials (primarily ethylene dichloride and bis(2-chloroethyl) ether). At the vapor temperature of the dichloride the reflux controller is turned to total take-off and the dichloride is removed. When no more distillate rises up the column, the distillation is terminated; at this point the vapor temperature is still that of the dichloride. The dichloride obtained in this manner is 99.9+% pure by gas-liquid chromatography.

(2) The reaction mixture is neutralized with the stoichiometric quantity of an aqueous 35% sodium hydroxide solution (for a 1.5 mole run 228.5 parts, 2.0 moles NaOH, of an aqueous 35.0% sodium hydroxide solution is used). The neutralization is carried out with efficient cooling and stirring so that the temperature remains at or below 50° C. The neutralized mixture (pH 8–10) is allowed to stand until the aqueous and organic phases have separated (about 1.5 hours). The bottom aqueous phase is removed, and the top organic layer is washed once with water. The bottom organic layer is removed and vacuum fractionated through a 10 bubble plate column as described in procedure 1.

(3) The reaction mixture is treated with an aqueous 15% sodium carbonate solution in an amount by weight of about 20% of the reactor charge with either slow stirring or careful shaking (vigorous shaking or stirring gives slowly separating emulsions). When no more carbon dioxide is evolved the mixture is allowed to stand until the aqueous and organic phases have separated. The bottom aqueous phase is removed and the organic layer is carefully washed with an aqueous 7.5% sodium carbonate solution in an amount by weight of about 20% of the reactor charge (again vigorous shaking or stirring should be avoided). The mixture is allowed to stand until the aqueous and organic phases have separated. At this point the pH of both phases is ≅7. The bottom organic layer is removed and washed once with 20% by weight of the reactor charge of water. The aqueous phase separates rather rapidly; the bottom organic layer is removed, and vacuum fractionated through a 10 bubble plate column as described in procedure 1.

EXAMPLE 2

The pressure system, which was designed for better hydrogen chloride utilization, consists of a two-liter four-necked resin flask fitted with a magnetic stirrer, a gas inlet, a thermometer, an addition funnel with a pressure equalizing arm which is topped with a stainless steel needle valve, and a gas exit. The gas exit is attached to a manometer which has a blow out capacity of about 10 pounds per square inch pressure and to a stainless steel needle valve for venting the system. The gas vent leads to a trap filled with sodium hydroxide solution.

Into the resin flask are placed 750.9 parts (5.0 moles) of triethylene glycol and 18.3 parts (0.25 mole, 5 mole percent based on glycol) dimethylformamide. Phosphorus trichloride (480.7 parts, 3.5 moles, a 5 percent excess) is placed in the addition funnel, and the system is closed. Phosphorus trichloride addition and stirring are begun with ice-bath cooling of the reaction mixture. The phosphorus trichloride is added at such a rate that the temperature of the mixture does not rise above 70° C. At the end of the addition the temperature of the reaction mixture is near 30° C., and the gauge pressure of the system is 14.5 to 17.5 pounds per square inch. The ice bath is replaced with a heating mantle, and the system is heated to 150° C. as rapidly as possible. During the heating period a slow vent is necessary to keep the pressure of the system below the blow-out pressure of 19 p.s.i.g. At a temperature of about 120° C. the vent is closed, and within several minutes after the temperature reaches 150° C. the gauge pressure has dropped to zero. The system is pressurized to 10 p.s.i.g. with anhydrous hydrogen chloride, and the reaction is allowed to continue for four hours at 10 p.s.i.g. pressure at 150° C. During the four hour reaction period the system is vented once each hour. The light yellow two-phase reaction mixture is cooled to room temperature.

The reaction mixture is processed by procedure 1 discussed previously and gives 792.3 grams (84.7% yield of theory) of triethylene glycol dichloride boiling at 71–73° C. at 1.0 mm. mercury pressure.

EXAMPLE 3

A high pressure reactor was designed to contain all the hydrogen chloride gas formed initially from the phosphorus trichloride and glycol so that no external hydrogen chloride has to be supplied to complete the reaction. The reactor is a one-liter silver-lined autoclave fitted with a stirrer, a Monel-nickel pressure gauge, a thermometer well containing a thermometer, a dip tube, and an exit vent. A pressure equalized addition funnel is attached to the top of the dip tube.

Into the autoclave are placed 225.3 parts (1.5 moles) of triethylene glycol and 5.5 parts (0.075 mole, 5 mole percent based on glycol) of dimethylformamide. Phosphorus trichloride (137.4 parts, 1.0 mole) is placed in the addition funnel and the reactor is closed except for the needle valve below the addition funnel. Addition of the phosphorus trichloride is carried out over a 15 minute period while the reactor is cooled in an ice bath. At the end of the addition the temperature and pressure are respectively 36.5° C. and 29 p.s.i.g. The needle valve below the addition funnel is closed; the ice bath is replaced with a heating mantle. The system is heated as rapidly as possible (28 minutes) to 150° C. During the heating period the pressure reaches a maximum of 121 p.s.i.g. at 115° C. and then begins to drop. At 150° C. the pressure has dropped to 90 p.s.i.g. The mixture is heated at 150° C. for four hours. The autoclave is cooled to room temperature, and the two-phase reaction mixture is distilled at reduced pressure through a packed column until a pot temperature of 150° C. is reached. The yield of triethylene glycol dichloride is 84.3%.

EXAMPLE 4

Into the low pressure reactor described in Example 2 are placed 324.4 parts (2.0 moles) of distilled 2-($\beta$-butoxyethoxy)ethanol and 7.3 parts (0.10 mole, 5 mole percent based on 2-($\beta$-butoxyethoxy)ethanol of dimethylformamide. Phosphorus trichloride (96.2 parts, 0.70 mole, 5 percent excess) is placed in the addition funnel, and added dropwise over a 5 minute period to the reaction mixture which is cooled in an ice bath. The temperature and presssure at the end of the addition are respectively 65° C. and 12.8 p.s.i.g. The cooling bath is replaced with a heating mantle, and the mixture is heated to 150° C. as rapidly as possible (25 minutes). During the heating a slow vent is necessary to keep the system pressure below the blowout capacity (19 p.s.i.g.) of the manometer. At 134° C. the vent is closed and by the time the temperature first reaches 150° C. the pressure has dropped to 16.8 p.s.i.g. The mixture is heated at 150° C. at 10 p.s.i.g. hydrogen chloride pressure for 4 hours, during which time the system is vented hourly. The reactor is cooled to room temperature, and the two phase reaction mixture is fractionally distilled through an eight inch column packed with glass helices to a pot temperature of 140° C. The yield of butyl 2-(2-chloroethoxy)-ethyl ether, B.P. 45.0–46.5 at 0.40 mm., is 264.8 parts or 73.6%. Vacuum fractionation through a ten bubble plate column gives the following boiling points for pure material:

B.P.:
    43.8° C. at 0.40 mm. mercury
    67.0° C. at 2.0 mm. mercury
    71.0° C. at 2.6 mm. mercury
    101.0° C. at 15 mm. mercury
    115.0° C. at 30 mm. mercury

EXAMPLE 5

Technical grade tetraethylene glycol (489.5 parts, 2.52 moles) and 9.2 parts (0.126 mole, 5 mole percent based on glycol) dimethylformamide are placed in the silver-lined autoclave described in Example 3. To the mixture, cooled in an ice bath, is added 235.0 parts (1.71 moles, 2 percent excess) of phosphorus trichloride within 11 minutes at the autogenous pressure of the system. The temperature and pressure at the end of the phosphorus trichloride addition are respectively 57° C. and 19 p.s.i.g. The autoclave is closed off from the addition funnel and the mixture is heated to 149° C. and held at this temperature for 0.9 hour. During the heating to 150° C., which requires about 38 minutes, the pressure rises to a maximum of 95.5 p.s.i.g. at 115° C. and after 0.9 hour at 149° C. the pressure is 75.5 p.s.i.g. (A minimum pressure of 72.5 p.s.i.g. at 149° C. was reached after a period of only 25 minutes.) The reaction mixture is cooled to room temperature and straight-lead distilled at 0.5 mm. The fraction (409.6 parts) boiling at 98–132° C. at 0.5 mm. is fractionated through a 10 bubble plate column at reduced pressure and affords 304.3 parts (52.3% of theory) of pure tetraethylene glycol dichloride, bis[2-(2-chloroethoxy)-ethyl] ether, boiling at 105° C. at 0.250 mm. mercury to 110° C. at 0.350 mm. mercury. The residue (252.9 parts) from the straight-lead distillation is returned to the autoclave and treated with anhydrous hydrogen chloride at 50 p.s.i.g. at 150° C. for two hours. Vacuum distillation of the crude reaction mixture affords an additional 25.3 parts of crude tetraethylene glycol dichloride. The yield of crude dichloride is 434.9 parts or 74.7%.

EXAMPLE 6

The two-stage process was designed to obtain the maximum utilization of hydrogen chloride from the initial reaction of phosphorus trichloride and glycol while maintaining a low hydrogen chloride pressure. Two all glass, pressure reactors are set up and interconnected with polyethylene pressure tubing. The interconnecting tube is attached to each reactor by a stainless steel needle valve and between the needle valves via a T-joint to a manometer. The gas flow from reactor one is controlled by stainless steel needle valves on the exit of reactor one, the inlet of reactor two, and the exit of reactor two. The tube connecting reactor one with two is also fitted with a three-way glass pressure stopcock for pressure equalization of either reactor when necessary. The hydrogen chloride gas is introduced into reactor two by way of a sintered-glass gas disperser. The exit gases are led from reactor two through a Dry Ice trap to a trap filled with sodium hydroxide solution. Each reactor is fitted with a thermometer; each reaction mixture is stirred magnetically. The phosphorus trichloride is introduced at the top of reactor one from a 100 ml. graduated-buret reservoir via a stainless steel piston pump through a stainless steel tube and needle valve. The liquid phosphorus trichloride is dropped from the head of the reactor onto the surface of the reaction mixture.

Into reactor one is poured 225.3 parts (1.5 moles) of commercial triethylene glycol. Into reactor two is placed the reaction mixture from reactor one which has been prepared in the previous run. Into the pump reservoir is poured 137.4 parts (1.0 mole, 87.5 ml.) phosphorus trichloride. After the mixture in reactor two has been heated to 140° C. and vented to zero pressure, the phosphorus trichloride is pumped into reactor one at a rate of 0.28 ml. per min. (16.8 ml. per hr.) so that the total addition time is 5.2 hours. The temperature of reactor one is so controlled that 2.45 hours is required to reach 70° C. after which the temperature is maintained at 70° C. for 2.75 hours—the time required to complete the addition of phosphorus trichloride. Reactor one is kept closed until the pressure has reached 1.0 p.s.i.g.; at this point the inlet valve into reactor two is slowly opened so that the pressure remains between 1.0 and 1.5 p.s.i.g. When the pressure reaches 1.5 p.s.i.g. with the inlet valve to reactor two wide open, the exit valve from reactor two is so adjusted that the pressure of the system remains between 1.0 and 1.5 p.s.i.g. When the stoichiometric quantity of phosphorus trichloride has been added, the temperature of reactor one is slowly raised over a 0.75–1.0 hour period to 90° C. At 90° C. reactor one is isolated from two, and the mixture in two is treated with external hydrogen chloride for 4 hours at 140° C. at 3 p.s.i.g. Each hour reactor two is vented to 1.0 p.s.i.g. and repressurized to 3.0 p.s.i.g. with hydrogen chloride. Reactor one is maintained at 90° C. until the pressure has dropped to zero; it is then allowed to cool to room temperature. The reaction mixture is now ready for treatment in reactor two. After the four-hour hydrochlorination period reactor two is vented to zero pressure, and allowed to cool to room temperature; the liquid is then discharged.

Product isolation by either procedure 1, 2, or 3 gives identical results within experimental error. The yield of fractionated triethylene glycol dichloride, B.P. 67–69° C. at 0.80 mm. mercury pressure, ranges from 76.3% to 79.5%.

EXAMPLE 7

To 850 grams (1.0 mole based on hydroxyl number of 66) of para-octylphenoxypolyethoxy alcohol $$[C_8H_{17}\text{—}C_6H_4\text{—}(OCH_2CH_2)_{15}\text{—}OH]$$

which is a Poisson distribution of compounds with an average molecular weight of 850, is added 45.8 grams (0.33 mole) of phosphorus trichloride at 70° C. at atmospheric pressure. The addition is carried out over one hour; only 1.05% of the available hydrogen chloride is lost. The reaction mixture is heated to 150° C. and treated with hydrogen chloride at 5 p.s.i.g. pressure for four hours. Each hour the system is vented and repressurized with new hydrogen chloride. The chloride product is isolated by washing the reaction mixture with aqueous 15% sodium carbonate solution until neutral. The product has a low hydroxyl number (2.4) and a cloud point of 37.5° C. The product is identified as $C_8H_{17}C_6H_4(OCH_2CH_2)_{15}Cl$.

Employing similar reaction conditions, there is prepared $C_6H_5CH_2(OCH_2CH_2)_{16}Cl$ by reacting phosphorus trichloride with $C_6H_5CH_2(OCH_2CH_2)_{16}OH$.

We claim:

1. A method for the preparation of a compound having the formula $R'(OCH_2CH_2)_nCl$ which comprises adding prosphorus trichloride to a compound having the formula $R(OCH_2CH_2)_nOH$ at a temperature of about 0° to 90° C. and then heating the reaction mixture in the presence of an amount of hydrogen chloride at least equal to the amount formed in the reaction to a temperature of about 80° to 200° C., the reaction being conducted at pressures of substantially at least atmospheric in which $n$ is an integer of from one to twenty, R is a member selected from the class consisting of alkyl of one to eight carbon atoms, aryl of six to ten carbon atoms, alkylaryl of 7 to 18 carbon atoms, arylalkyl of 7 to 10 carbon atoms, $HOCH_2CH_2$— or $ClCH_2CH_2$— and R' is alkyl of one to eight carbon atoms, aryl of six to ten carbon atoms, arylalkyl of 7 to 10 carbon atoms, alkylaryl of 7 to 18 carbon atoms, or $ClCH_2CH_2$—, wherein said R of the reactant corresponds to said R' of the product except that when said R represents $HOCH_2CH_2$—, said R' represents $ClCH_2CH_2$—.

2. A method according to claim 1 in which the addition of the phosphorus trichloride is conducted in the temperature range of about 10° to 70° C. and the subsequent reaction period is conducted in the temperature range of about 120° to 160° C., the reaction being conducted at pressures from atmospheric to about 150 p.s.i.g.

3. A method according to claim 2 wherein phosphorus trichloride is used in excess of no more than 10% based on stoichiometry.

4. A method according to claim 1 wherein the reaction is conducted in the presence of dimethylformamide and at pressures of about 2 to 130 p.s.i.g.

5. A method according to claim 1 in which the glycol reactant is triethylene glycol.

6. A method according to claim 1 in which the alcohol reactant is 2-($\beta$-butoxyethoxy)ethanol.

7. A method according to claim 1 in which the glycol reactant is tetraethylene glycol.

References Cited by the Examiner

UNITED STATES PATENTS 2,837,574   6/1958   Hill et al. _____ 260—615

OTHER REFERENCES

Gerrard et al., Jour. Chem. Society (London), pages 914–917 (1952).

Gerrard et al., Jour. Chem. Society (London), pages 1920–1926 (1953).

LEON ZITVER, *Primary Examiner.*

LORRAINE A. WEINBERGER, *Examiner.*

B. HELFIN, H. T. MARS, *Assistant Examiners.*